Feb. 8, 1955     F. SPRAGUE     2,701,621
AIR FILTER
Filed March 11, 1953     2 Sheets-Sheet 1
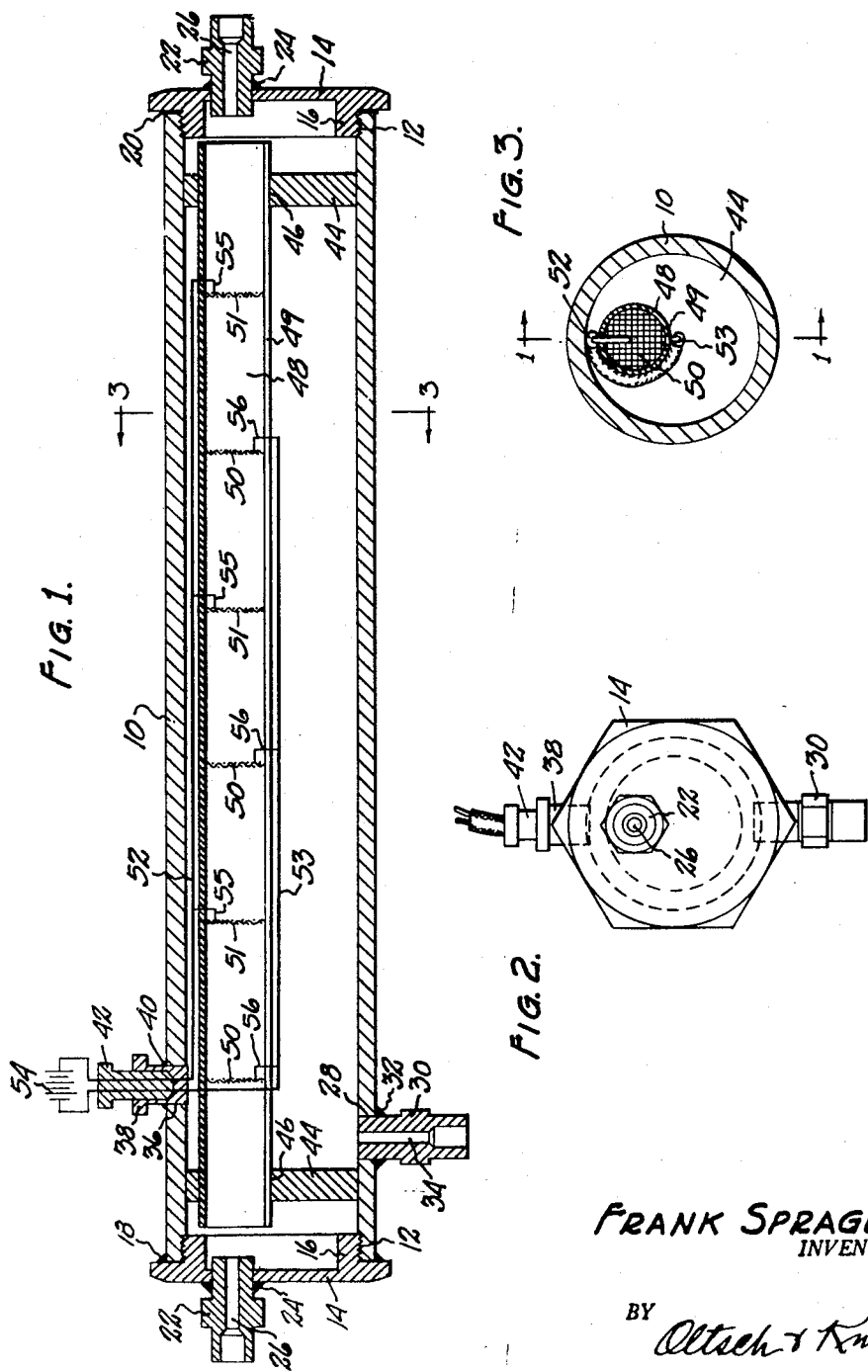
FRANK SPRAGUE.
INVENTOR.
BY Oltsch & Knoblock
ATTORNEYS.

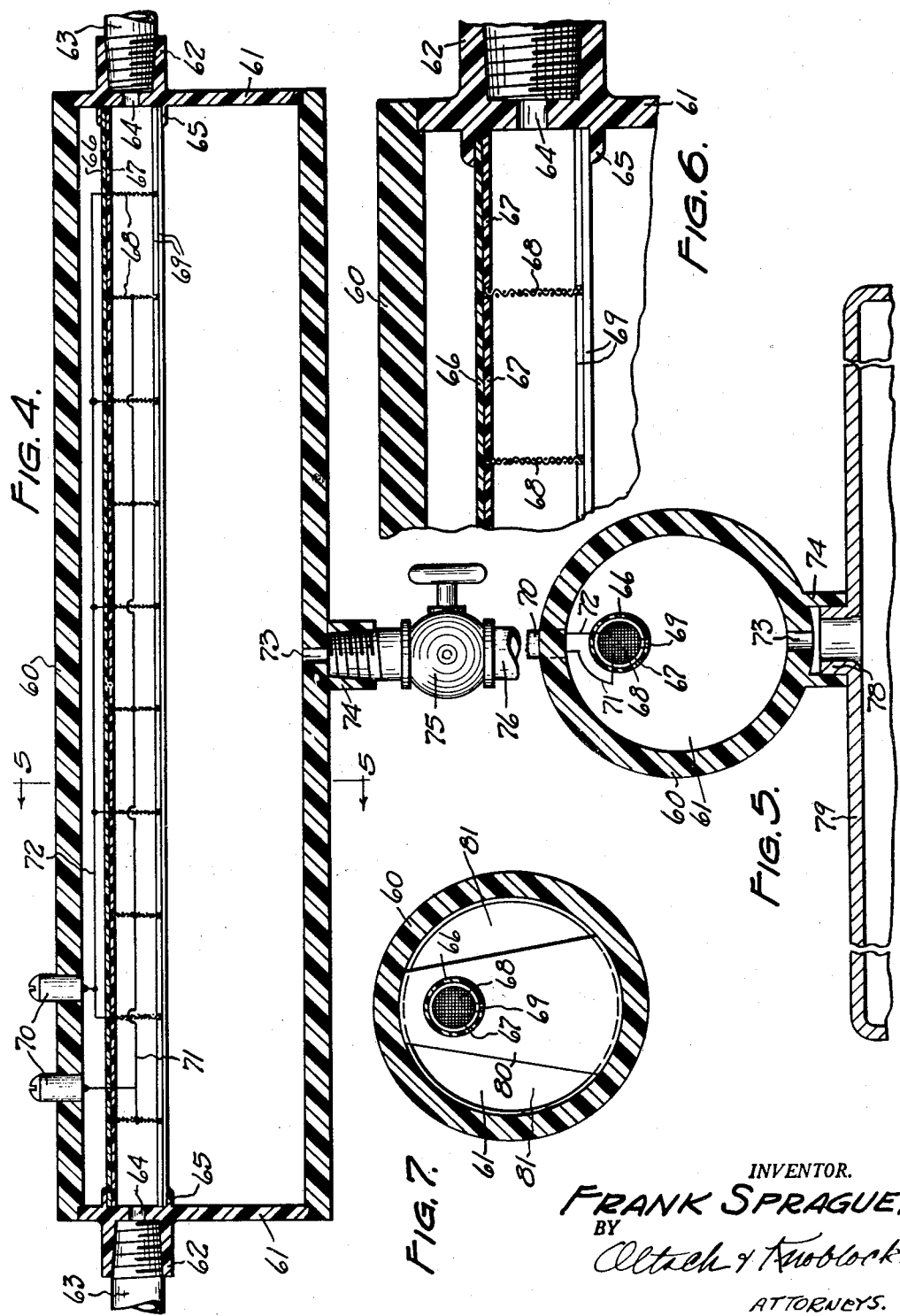

United States Patent Office 2,701,621
Patented Feb. 8, 1955

2,701,621

AIR FILTER

Frank Sprague, Springfield, Mass.

Application March 11, 1953, Serial No. 341,651

6 Claims. (Cl. 183—7)

This invention relates to improvements in air filters, and has for its primary object the removal of extraneous particles of fluid or vapors from a current of air in which the same are entrained.

This application is a continuation-in-part of my co-pending application, Ser. No. 37,257, filed July 6, 1948, now abandoned.

A further object of the invention is to provide a novel, simple and efficient device of this character in which an electric current energizes electrodes and is utilized to alter the charge of entrained particles, fluid or vapor and to induce turbulence in the flow of the air, whereby the contact of the particles, fluid or vapor with the electrodes and with each other between electrodes is increased to form drops so that precipitation thereof is facilitated.

A further object is to provide a filter of this character which is constructed for energization by an electric current of low value to achieve an efficiency attained by that of prior devices operating at much higher voltages.

A further object is to provide a filter of this character, wherein a non-conductive tube is so mounted in a housing, to which air to be filtered is supplied, that said air is caused to travel therethrough, and wherein a plurality of electrically conductive reticulated members span said tube at spaced intervals with alternate members charged with electric current of opposite polarity, and wherein said tube has one or more openings at its bottom and adjacent said conductive members for discharge of foreign matter from the tube upon precipitation thereof incident to contact with said conductive members.

Other objects will be apparent from the following specification.

In the drawings:

Fig. 1 is a longitudinal vertical sectional view taken on line 1—1 of Fig. 3.

Fig. 2 is an end view of the device viewed from the right in Fig. 1.

Fig. 3 is a transverse sectional view of the device taken on line 3—3 of Fig. 1.

Fig. 4 is an axial sectional view of another embodiment of the invention.

Fig. 5 is a transverse sectional view taken on line 5—5 of Fig. 4.

Fig. 6 is an enlarged fragmentary longitudinal sectional view similar to Fig. 5.

Fig. 7 is a transverse sectional view of another embodiment of the invention.

Referring to the drawings, and particularly to Figs. 1 to 3 which illustrate one embodiment of the invention, the numeral 10 designates a housing or casing. In its preferred form the housing or casing 10 is a tubular member, such as a section of a conduit whose length is greater than its diameter as shown, and may be formed either of conductive or non-conductive material. The opposite ends of the casing 10 are internally screw-threaded at 12, and end caps 14 provided with externally screw-threaded tubular flanges 16 fit and interlock at the threaded ends 12 of the casing 10. The end members 14 are preferably of a size or diameter equal to or greater than the cross-sectional size of the casing 10, and the marginal portions of one of the caps 14, here shown as the left-hand cap in Fig. 1, may be welded at 18 if desired. The remaining cap, here shown as the right-hand cap, is preferably removable, and a suitable gasket 20 may be interposed between the end of the casing 10 and the cap 14. Each of the caps 14 preferably has a fitting 22 mounted in an opening extending therethrough, said fittings preferably being welded at 24 to provide a sealed connection with the cap mounting the same. Each of the fittings will be provided with a bore 26 extending therethrough and providing for communication with the interior of the casing 10. The fittings will be adapted for connection with conduits or other parts of an air flow or fluid system in the manner well understood in the art.

The casing 10 will preferably be provided with an opening 28 at an intermediate portion thereof within which a fitting 30 is mounted. The fitting 30 will be welded at 32 to provide a sealed connection with the casing 10 and has a bore 34 therethrough for communication with the interior of the casing 10. This fitting 30 is of any suitable type common in the art and may be adapted for connection of a conduit thereto. The fitting 30 preferably extends radially from the casing 10 and, in the normal operative position of the device, will be located at the vertical axis thereof to depend from the casing 10. A second opening 36 is formed in the casing 10 intermediate its ends and preferably at the upper portion thereof to be substantially aligned with the vertical axis thereof. The opening 36 receives a fitting 38 which is preferably welded thereto at 40 to provide a sealed joint. The fitting has an opening extending therethrough provided with a tapered reduced diameter portion intermediate its ends. A second fitting 42 formed of dielectric material is adapted to be mounted removably in the fitting 38 and to have a sealed fit therewith. In the preferred form this fitting will preferably be screw-threaded in the fitting 38, although a snug releasable fit between these parts may be employed if desired.

Partition members 44 are mounted in the casing 10 adjacent the opposite ends thereof. These partitions may be formed of fiber board, plastic or other suitable rigid, substantially non-porous, non-conducting or insulating material. The partition members 44 fit snugly within the casing 10. As here illustrated these partitions are so positioned that the tube cavity therebetween communicates with the openings in the fittings 30 and 38. The partitions 44 will preferably be spaced inwardly from the end caps 14. The partitions 44 each has an opening or aperture 46 formed therein, preferably eccentrically thereof and adjacent the upper part of the casing 10 as illustrated. The openings 46 in the partitions 44 are preferably axially aligned with their axes parallel to the axis of the casing 10 and receive and support therebetween the end portions of an elongated tube 48. The tube 48 is preferably formed of plastic material, although any other suitable non-conductive material may be employed. The tube 48 is supported and positioned by the partitions 44 and is of such length that when centered within the casing 10 longitudinally thereof its ends will be juxtaposed to but spaced slightly from the opposite end caps 14. As best seen in Fig. 1, the fittings 22 in the end caps 14 are preferably mounted eccentrically thereof and in substantial alignment with the conduit 48, and the diameters of the bores 26 of said fittings are substantially less than the diameter of the bore of the conduit 48. The conduit or tube 48 has a slot 50 extending longitudinally thereof at its lowermost portion for purposes to be described. At substantially equispaced intervals along the length of the conduit or tube 48, greater than the diameter of said conduit and substantially equal to the diameter of the bore of the tubular casing 10 as shown, are provided a series of reticulated members 50 which are formed of conductive material. These members are here identified by the numerals 50 and 51. In the preferred form the members 50 and 51 comprise copper screening of any mesh selected which will not interfere substantially with the free flow of pure air therepast but which will provide abutment surfaces adapted to be engaged by particles entrained in the air. The mesh of the wire will depend in part upon the character and service intended for the device. A pair of conductors 52 and 53 extend through the fitting 42 with their outer portions adapted for connection with a source of electric current 54 which may be a battery, a generator or an alternating current supply circuit including a transformer, and which preferably is a motor vehicle battery having a voltage of at least six volts and not greatly exceeding 12 volts. Higher voltages may be employed, but are not required. The conductors 52 and 53 extend longitudinally of the casing 10 adjacent the conduit 48 and preferably will be insulated against electrical connection with the casing 10 in instances where the casing 10 is formed of a conductive material. At spaced intervals the conductor 52 is connected electrically by leads 55 with the screens 51. Similarly, leads 56 are tapped from the conductor 53 and connected with the reticulated members 50.

The device is intended for use in air systems which are subject to the entrainment therein of foreign matter, such as particles of dust, fluid, vapors and the like. One field of use in which the invention may be applied is for use in the air brake systems, etc., of motor vehicles. It will be apparent that in such instance the fittings 22 may be connected in the air line, preferably at the outlet side of an air compressor, although permissibly at the inlet side of a compressor, and a conduit may be connected to the fitting 30 and have connected therein a valve which will prevent the escape of air therepast. The device is positioned in the system with the major axis of the casing 10 positioned horizontally and with the tube 48 similarly positioned horizontally with its outlet slot or opening 50 positioned lowermost. The air which enters the device from the inlet, which we will assume to be the right-hand inlet 22, flows longitudinally through the device to the opposite or left-hand fitting 22. The air will be at a given pressure depending upon the pressure existing within the system in which the device is connected and has a tendency normally to rise, particularly if it is above atmospheric pressure so that it has been heated as a result of compression. The partitions 44, if spanning the housing 10, form barriers to the passage of air except through the conduit 48, and the natural tendency of the air to rise serves to maintain the flow of air in the device through said conduit. It will be understood, of course, that when the system is static, the pressure of air in the device will equalize throughout, that is, within the housing 10 and both within and outside of the tube 48. The conductive reticulated members 50 and 51, which may be considered to be electrodes, are suitably charged, it being apparent from the connection of the device with opposite sides of the line, that is, with the conductors 52 and 53, that the alternate electrodes 50 and 51 will be of opposite polarity.

As the particle-laden air approaches or passes through each of the electrodes 50 and 51, there is a tendency for any charge of the entrained particles to be altered by the potential of the electrodes. Furthermore, a zone of turbulence is created around each electrode and between adjacent electrodes. The two factors, that is, a tendency to change the polarity of the charge of the particle and the creation of turbulence, tend to increase or enhance the likelihood that the entrained particles will come in contact with the reticulated members 50 and 51 and be deposited thereon by the air current. After deposit such particles are subject to precipitation and may fall freely through the elongated slot 50 in the tube 48 onto the lowermost wall portion of the casing 10 from which they pass to the outlet bore 34 in the fitting 30. In most instances the entrained particles will be in the form of liquid vapors, such as oil vapors, and the deposit thereof upon the members 50 and 51 will result in the formation of drops which can flow downwardly on the members 50 and 51 and through the slot 50 to the bottom wall of the casing 10 and therealong to the outlet bore 34 of the fitting 30. In other words, a plurality of electrodes provide baffles to release from entrainment in an air current the extraneous particles in that air current, and the releasing action is accomplished by the combination of electrical and physical filtering actions.

Also, air borne or entrained particles charged to opposite polarity are subject to contact in the zones between the members 50, with the result that they merge and form droplets of a mass great enough to precipitate and drain through slot 49 and into the bottom of housing 10. In this connection, the increase in the cross-sectional area of tube 48 compared to the inlet tube cross-section results in reduction of the velocity of the particle entrained air within the device and thus enhances the possibilities of contact and merging of particles between the electrodes.

One of the outstanding advantages of the device is the fact that a current of a much lower voltage than has been possible heretofore in the devices commonly used for filtering and precipitating purposes may be employed. Thus previous devices have commonly used two electrodes, one usually in the end of a tube and the other in the end of a rod substantially concentric within the tube, which are oppositely charged and which require a high voltage to secure the desired precipitation. With the present invention voltages as low as six volts have been found to be satisfactory and effective in producing the desired filtering and precipitating action. Observe in this connection that the provision of the reticulated electrodes, and particularly the screens requiring all particles of air in passing the same to be substantially uniformly acted upon by each of the various baffles incident to normal air flow through tube 48 from inlet to outlet of the device, overcomes a condition encountered in the prior art where particles of air traveling in different paths spaced at different distances from the electrodes will be subject to a different action with respect to the opposite electrodes.

A modified embodiment of the invention is illustrated in Figs. 4 to 6, inclusive. In this embodiment the tubular housing 60 of the device is formed of dielectric material, such as a plastic or synthetic resin of the dielectric type, the same being of greater length than cross-sectional dimension. The end walls 61 are secured to the ends of the housing 60 in any suitable manner, and at least one thereof is mounted detachably, as by screw threads, or the like (not shown). The end walls 61 preferably have integrally formed therewith tubular sockets 62 extending outwardly and preferably internally screw-threaded for the connection of fittings 63. These fittings 63 preferably constitute reducers for connection with conduits of comparatively small diameter which constitute parts of a compressed air system. An aperture 64 is formed in each end wall 61 in communication with and preferably centrally relative to the adjacent socket 62, the same being of reduced diameter compared to the bore of the socket.

Each end wall preferably mounts a tubular inwardly projecting flange 65 substantially concentric with the aperture 64. A tube unit is carried by the tubular flange 65. This tube unit is of a diameter substantially smaller than the bore of the tube 60 and, as here shown, is positioned eccentrically thereof adjacent but spaced relative to the uppermost wall portion of the tube 60 and spaced a substantial distance above the lowermost wall of the tube 60. This tube unit preferably includes an outer tube 66 preferably formed of a dielectric material of a length substantially equal to the length of the tube 60 so that its opposite ends are supported by the tubular flange 65. Within this tube are mounted a plurality of tubular spacers 67 having a snug sliding fit therein and preferably being of a length at least equal to their diameter. It will be understood that the length of the spacer members 67 may vary substantially, and, while the same may in some instances be of a length less than their diameter, the same should not be substantially less in length than diameter.

Reticulated members 68, preferably formed of copper screening of a size substantially equal to the bore of the tube 66, are mounted in that tube to span the same. The screens 68 are interposed between adjacent spacers 67 to be positioned and held thereby insulated from each other. The tubes 66 and the spacers 67 have registering slots 69 formed centrally at the bottom thereof and extending substantially full length thereof. The arrangement is preferably such that the tubular assembly has a bore, namely, the bore of the spacers 67, which is substantially greater than the bore of the tubes of the air system connected at the fitting 63, and this bore is spanned at substantially uniformly spaced intervals by transverse electrically conductive recticulated members or screens 68.

A pair of terminal members 70 are carried by the housing of the device, preferably by the tube 60, in electrically insulated relation, and these terminals have connections with conductors 71 and 72, respectively. The number of screens 68 is preferably even and is greater than two so that each of the conductors 71 and 72 may be connected electrically with a plurality of screen members 68. As here shown, the conductor 71 is connected to alternate screens 68 throughout the length of the device, and the conductor 72 is connected to the screens intervening or between those at which the conductor 71 is connected. The terminals 70 will be connected to a battery or other source of low voltage electrical potential, and preferably the voltage of the battery of a vehicle. The housing 60 is provided with a drain outlet 73 at its bottom, the same preferably being spaced substantially below the tube unit 66, 67 and being centered with respect to a socket at which is connected a valve member 75 in turn leading to an outlet conduit 76. The valve 75 will normally be closed so that it seals the outlet of the housing against the escape of air under pressure.

This embodiment of the invention possesses the same advantages and operates in substantially the same way as the preferred embodiment. In this form the lower portion of the tube 60 serves as a collector for condensate, and it is necessary for the valve 75 to be opened periodically in order to drain condensate from the device. When the device is connected in the compressed air line, the normal flow of air therethrough will extend through the tubular unit so as to pass through the screens 68 for charging of airborne particles therein, causing particles to be attracted to one another either in the zones of turbulence between screens or at the screens, all as explained above.

In Fig. 5 the socket 74 at the bottom of the device is shown as being connected to a neck portion 78 of a container 79 which may constitute a reservoir or sump for the collection of matter precipitated out of the air stream. In this connection, the atmospheric conditions in which the device operates changes with the weather and other factors, and under some conditions large quantities of material may be precipitated by the device. In order to reduce the quantities of moisture which are precipitated, it is desirable to use the device in a system behind an after-cooler. The normal function of the after-cooler to remove excessive moisture from condensed air is permitted to be performed, and this unit removes only residual moisture with particles of oil and other foreign matter, and the quantity of material precipitated will be less than would be the case in a unit positioned ahead of an after-cooler or ahead of a compresor.

Fig. 7 illustrates substantially the same construction as shown in Figs. 1 and 4. However, in this instance the tubular assembly is shown supported intermediate its ends in an aperture of a strut or support member 80 which spans the container 70 in one direction thereof, but is of comparatively narrow width so as to provide spaces at 81 at each side of the member 80 through which air may pass. One or more of the members 80 may be provided in the device.

While the preferred construction of the device has been illustrated and described herein, it will be understood that changes may be made therein within the scope of the appended claims without departing from the spirit of the invention.

I claim:

1. An air filter comprising a substantially horizontal elongated housing having an inlet for gases to be cleaned at one end and an outlet for cleaned gases at its opposite end, a pair of partitions sealed transversely of said housing adjacent to but spaced from opposite ends thereof and each having an aperture therein, a tubular member formed of dielectric material supported in sealed relation in said partition apertures, the ends of said tubes terminating spaced from the ends of said housing and the intermediate portion of said tube having an elongated slot in its lowermost part, a plurality of reticulated electrically conductive members spanning said tube in spaced relation, and means for electrically charging alternate conductive members to opposite polarity.

2. The construction defined in claim 1, wherein said housing has a condensate outlet in its lowermost portion and intermediate said partitions.

3. The construction defined in claim 1, wherein said conductive members each constitute a copper screen.

4. The construction defined in claim 1, wherein said housing comprises a tube and a pair of end caps detachably mounted on the opposite ends of the tube and respectively provided with said inlet and outlet.

5. An air filter comprising a housing having opposite end walls, an inlet at one end wall for air to be cleaned, an outlet for cleaned air at its opposite end wall and a condensate outlet at its lowermost portion, a tube of greater length than width and of an outer cross-sectional size smaller than the interior cross-sectional size of said housing, means mounting said tube in said housing spaced above said condensate outlet with its ends positioned adjacent to and communicating with said air inlet and outlet respectively for passage of air therethrough, a plurality of spaced reticulated electrodes transversely spanning said tube and insulated from adjacent electrodes, and means for electrically charging said electrodes whereby adjacent electrodes are of opposite polarity, said tube having a longitudinal outlet adjacent and below said electrodes for discharge of condensate by gravity, and means closing said condensate outlet to atmosphere.

6. A gas filter comprising a substantially horizontal housing of greater length than width having an inlet for gases to be cleaned and an outlet for cleaned gases spaced from said inlet, a substantially horizontal elongated tube whose outer cross-sectional size is smaller than the inner cross-sectional size of the housing formed of dielectric material for conducting gas from said inlet to said outlet, a plurality of reticulated electrically conductive members transversely spanning said tube, and means for electrically charging alternate conductive members to different electrical polarity, said conductive members being spaced apart a distance at least of the order of the diameter of said tube bore and sufficient to accommodate mutual attraction and joining of particles charged electrically by said electrodes to opposite polarity, said tube being spaced above the lower part of said housing, said tube and housing each having an opening at its bottom for discharging by gravity any foreign matter, and means for normally closing said housing opening to atmosphere.

References Cited in the file of this patent

UNITED STATES PATENTS 1,062,924 Woods ---------------- May 27, 1913

FOREIGN PATENTS 766,263 France ---------------- Apr. 9, 1934